United States Patent
Betting et al.

(10) Patent No.: US 7,494,535 B2
(45) Date of Patent: Feb. 24, 2009

(54) CYCLONIC FLUID SEPARATOR

(75) Inventors: Marco Betting, Rijswijk (NL); Cornelis Antonie Tjeenk Willink, Rijswijk (NL)

(73) Assignee: Shell Oil Company, Houston, TX (US)

( * ) Notice: Subject to any disclaimer, the term of this patent is extended or adjusted under 35 U.S.C. 154(b) by 611 days.

(21) Appl. No.: 10/526,281

(22) PCT Filed: Sep. 2, 2003

(86) PCT No.: PCT/EP03/09810

§ 371 (c)(1),
(2), (4) Date: Jun. 27, 2005

(87) PCT Pub. No.: WO2004/020074

PCT Pub. Date: Mar. 11, 2004

(65) Prior Publication Data

US 2006/0021305 A1  Feb. 2, 2006

(30) Foreign Application Priority Data

Sep. 2, 2002  (EP) .................................. 02078596

(51) Int. Cl.
*B01D 51/08* (2006.01)
*B01D 45/12* (2006.01)
(52) U.S. Cl. .............................. 96/389; 55/396; 55/456
(58) Field of Classification Search .................... 95/29, 95/32, 34; 96/389; 55/405, 396, 456
See application file for complete search history.

(56) References Cited

U.S. PATENT DOCUMENTS

| | | | |
|---|---|---|---|
| 3,155,401 A | 11/1964 | Musolf | 285/18 |
| 3,185,181 A | 5/1965 | Demyan | 138/37 |
| 3,258,895 A * | 7/1966 | Wiebe et al. | 95/269 |
| 3,297,344 A | 1/1967 | Hanes | 285/141 |
| 3,443,368 A * | 5/1969 | Wilson et al. | 55/435 |
| 3,493,050 A | 2/1970 | Kelley et al. | 166/267 |
| 3,544,170 A | 12/1970 | Bowles | 302/28 |

(Continued)

FOREIGN PATENT DOCUMENTS

DE  2243926  3/1974

(Continued)

OTHER PUBLICATIONS

International Search Report dated Nov. 7, 2003.

*Primary Examiner*—Duane S Smith
*Assistant Examiner*—Sonji Turner

(57) ABSTRACT

A cyclonic fluid separator for separating condensable, liquid and/or solid components from a fluid mixture includes an upstream fluid inlet section in which the fluid mixture is accelerated to a supersonic velocity to expand and cool the fluid mixture such that one or more condensable fluid components are liquefied and/or solidified; a downstream separation section in which condensables depleted and condensables enriched fluid fractions are separated and fed into separate outlets; and a midstream vortex generation section which includes a plurality of tilted wings of which the wing tips are located at relatively large mutual spacings and at a small spacing from the inner wall of the midstream vortex generation section such that during normal operation of the separator adjacent to the various wing tips widely spaced vortices of swirling fluid are generated in the fluid stream flowing through the housing, which vortices are still separated from each other at the entrance of the downstream separation section.

11 Claims, 2 Drawing Sheets

U.S. PATENT DOCUMENTS

| | | | |
|---|---|---|---|
| 3,559,373 A | 2/1971 | Garrett | 55/9 |
| 3,599,400 A | 8/1971 | Orleux | 55/203 |
| 3,616,596 A | 11/1971 | Campargue | 55/17 |
| 3,626,665 A | 12/1971 | Fenn et al. | 55/17 |
| 3,720,263 A | 3/1973 | Murphy et al. | 166/303 |
| 3,725,271 A | 4/1973 | Giannotti | 210/65 |
| 3,892,070 A | 7/1975 | Bose | 60/279 |
| 3,894,851 A | 7/1975 | Gorman | 55/94 |
| 3,997,008 A | 12/1976 | Kellner | 175/45 |
| 4,102,401 A | 7/1978 | Erbstoesser | 166/284 |
| 4,141,701 A | 2/1979 | Ewan et al. | 55/909 |
| 4,194,718 A | 3/1980 | Baker et al. | 251/14 |
| 4,272,499 A | 6/1981 | Cason et al. | 423/242 |
| 4,292,050 A | 9/1981 | Linhardt et al. | 55/1 |
| 4,308,134 A | 12/1981 | Lilleker et al. | 209/211 |
| 4,531,584 A | 7/1985 | Ward | 166/265 |
| 4,541,845 A | 9/1985 | Michel-Kim | 55/17 |
| 4,606,557 A | 8/1986 | Coffey | 285/18 |
| 4,823,880 A | 4/1989 | Klatt | 166/373 |
| 4,898,235 A | 2/1990 | Enright | 166/64 |
| 5,261,242 A | 11/1993 | Lardinois | 62/11 |
| 5,333,684 A | 8/1994 | Walter et al. | 166/54 |
| 5,444,684 A | 8/1995 | Yanagi et al. | 369/544.28 |
| 5,682,759 A | 11/1997 | Hays | 62/402 |
| 5,713,416 A | 2/1998 | Chatterji et al. | 166/263 |
| 5,794,697 A | 8/1998 | Wolflick et al. | 166/265 |
| 6,222,083 B1 | 4/2001 | Colle | 585/15 |
| 6,237,691 B1 | 5/2001 | Kelley et al. | 166/370 |
| 6,280,502 B1 | 8/2001 | van Veen et al. | 95/29 |
| 6,372,019 B1 | 4/2002 | Alferov et al. | 95/29 |
| 6,447,574 B1 | 9/2002 | Fgrier, Jr. et al. | 95/29 |
| 6,524,368 B2 | 2/2003 | Bewtting et al. | 95/29 |
| 6,962,199 B1 * | 11/2005 | Tjeenk Willink | 166/265 |
| 2002/0194988 A1 | 12/2002 | Bewtting et al. | 95/29 |
| 2003/0145724 A1 | 8/2003 | Betting et al. | 95/29 |

FOREIGN PATENT DOCUMENTS

| | | |
|---|---|---|
| DE | 10040015 | 2/2002 |
| EP | 0496128 | 7/1992 |
| EP | 0711903 | 5/1996 |
| EP | 1141520 | 10/2001 |
| GB | 1103130 | 2/1968 |
| GB | 2037610 | 7/1980 |
| JP | 63165849 | 7/1980 |
| JP | 02017921 | 1/1990 |
| NL | 8901841 | 2/1991 |
| SU | 593717 | 2/1978 |
| SU | 1172540 | 8/1985 |
| SU | 1768242 | 10/1992 |
| WO | 95/09970 | 4/1995 |
| WO | 99/01194 | 1/1999 |
| WO | 00/40835 | 7/2000 |
| WO | 01/21286 | 3/2001 |

* cited by examiner

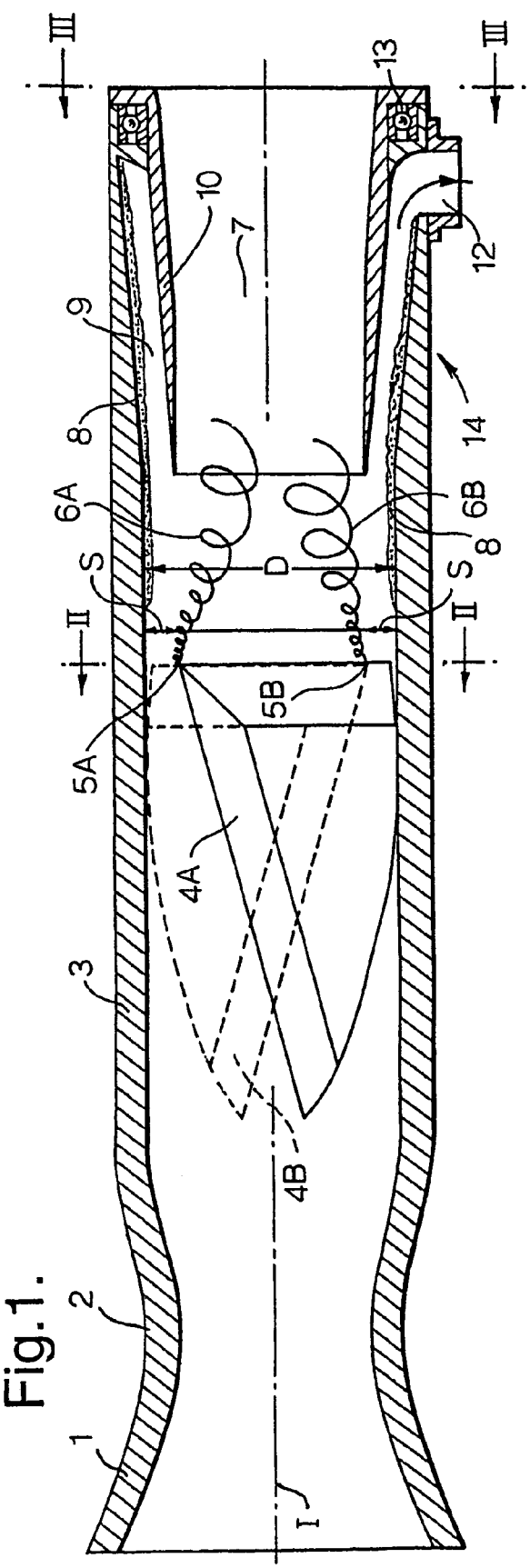
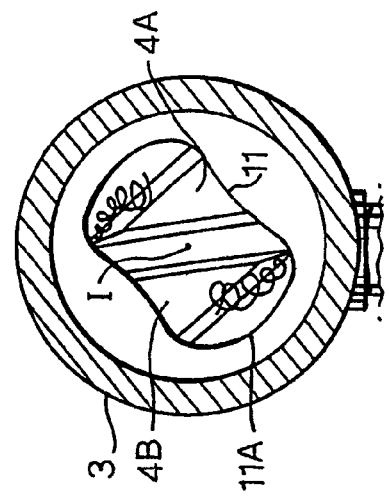
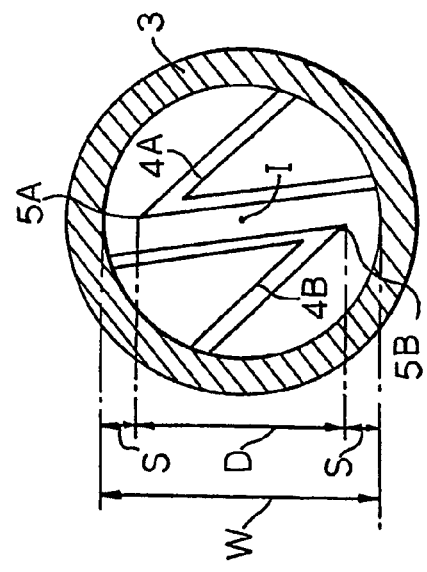

CYCLONIC FLUID SEPARATOR

PRIORITY CLAIM

The present application claim priority on European Patent Application 02078596.0 filed 2 Sep. 2002.

1. Field of the Invention

The present invention relates to a cyclonic fluid separator for separating one or more condensable, liquid and/or solid components from a multi component fluid mixture.

2. Background of the Invention

Such a cyclonic fluid separator is known from European patent application 0496128 and from International patent application WO99/01194.

The cyclonic fluid separators known from these prior art references comprise an upstream inlet section in which the fluid is accelerated to a supersonic velocity and cooled, a midstream vortex generation section in which one or more tilted wings generate a vortex in the accelerated cold fluid stream and a downstream separation section in which condensables enriched and condensables depleted fluid fractions are separated and fed into separate fluid outlet conduits. The acceleration of the fluid stream in the inlet section to a supersonic velocity causes the fluid to expand and rapidly cool to a temperature well below 0 degrees Celsius such that one or more condensable components, for example aqueous and $C_5^+$-hydrocarbon components, condense and/or solidify. The vortex generated by the tilted wing or wings in the cooled fluid stream causes the mixture of cold gaseous fluid components and a mist of condensed liquefied and/or solidified components to swirl around in the tubular midstream section of the tubular separator housing, whereby centrifugal forces create near a downstream end of the midstream section a condensables enriched fluid mixture near the outer circumference of the interior of the tubular midstream section and a condensables depleted fluid mixture near a central axis of the tubular midstream section. The swirling fluid mixture subsequently flows from the midstream section into a separation section in which a tubular vortex finder is centrally arranged such that the condensables depleted fluid mixture flows into the interior of the tubular vortex finder and the condensables enriched fluid mixture flows into an annular space between the outer surface of the tubular vortex finder and the inner surface of the separation section of the separator.

Soviet patent specification SU 1768242 discloses a tubular cyclonic separator in which a fluid is fed into an annular nozzle in which a vortex is generated by a series of vanes, which extend between a central body within the nozzle and the tubular housing of the separator. Said central body has a larger cross-sectional circumference downstream of the vanes, such that a throat is created where the fluid is accelerated to a supersonic velocity and thereby expanded and cooled such that condensable components condense and/or solidify and a condensables enriched fluid stream is separated from the swirling fluid mixture via one or more outlet openings in the tubular separator housing.

The known cyclonic fluid separators are able to separate a significant portion of condensable components from a fluid mixture and the present invention aims to further increase the separation efficiency of cyclonic fluid separators.

SUMMARY OF THE INVENTION

The cyclonic fluid separator according to the invention comprises an upstream fluid inlet section in which the fluid mixture is accelerated to near sonic or supersonic velocity to expand and cool the fluid mixture such that one or more condensable fluid components are liquefied and/or solidified, a downstream separation section in which condensables depleted and condensables enriched fluid fractions are separated and fed into separate outlets, and a tubular midstream vortex generation section comprising a plurality of tilted wings (see also FIG. 2) having wing tips that are located at a spacing S less than 0.2W from the inner surface of the tubular midstream vortex generation section, which has an internal width W in the region of the wing tips. The fluid fed to the cyclonic fluid separator might also contain liquid or solid particles to be separated in the downstream separation section.

It has been found that adjacent to the tip of each wing a vortex is generated and that adjacent to the various wing tips that are widely spaced from each other vortices are generated, that are also widely spaced from each other. Said vortices also swirl in helical paths around each other. Thus the centers of rotation of the various vortices form helical lines, which gradually commingle and converge towards a single vortex, which has a center of rotation at or near the central axis of the tubular housing.

It has been found that the presence of various widely spaced vortices generated at the widely spaced wing tips of the cyclonic fluid separation cyclone according to the invention significantly enhances its separation efficiency.

The entrance of the tubular vortex finder may have an oval or corrugated shape, which is adapted to the contours of the vortices at the location of said entrance.

The wings may be delta shaped and protrude from an inner surface of the midstream tubular vortex generation section. This vortex generation section may be located downstream of a throat section in which the fluid is accelerated to a supersonic velocity and thereby expanded and cooled and upstream of a corrugated tubular vortex finder which separates the cooled gaseous phase from a cooled condensables enriched phase. It is preferred that the delta shaped wings span a majority of the width of the tubular midstream vortex generation section, such that the cross-axial distance between the root and tip of each wing is more than 0.8W and that the distance between the tip of each wing and the opposite side of the inner surface of the tubular midstream section is less than 0.2W, more particularly less than 0.15W.

It will be understood that if the tubular midstream vortex generation section has a cylindrical inner surface the width W is equal to twice the internal diameter of said tubular section and that if said section is oval or corrugated that the width W equals the average internal diameter of said section.

Alternatively, the wings are mounted on a central wing carrier body which extends from a tubular separation section through a throat section into a nozzle in the tubular inlet section of the separator and comprises in the region of the throat of the nozzle a profiled section having a larger cross-axial surface than the section of the carrier body on which the wings are mounted. Thus the wing carrier body forms a central mandrel within the nozzle and reduces or eliminates the requirement of a throat portion where the tubular inlet section of the separator has a reduced internal diameter at the location of the nozzle. The width of the nozzle can be adjusted by moving the carrier body in longitudinal direction though the separator housing or by replacing the carrier body by another carrier body, which has a different profile in the region of the nozzle.

In this specification and in the appended claims the terms condensable components and/or condensables are intended to encompass components which condense and/or solidify at the prevailing local temperatures in the interior of the separator. Some condensable components, such as water vapour, may either first condensate to a mist of liquid droplets and then solidify into solid, e.g. ice, crystals, whereas other condensable components may instantly solidify from a gaseous into a solid phase.

BRIEF DESCRIPTION OF THE DRAWINGS

The invention will be described in more detail and by way of example with reference to the accompanying drawings, in which:

FIG. 1 is a schematic longitudinal sectional view of a cyclonic fluid separator according to the present invention;

FIG. 2 is a cross-sectional view of the cyclonic fluid separator of FIG. 1 taken along line II-II and seen in the direction of the arrows;

FIG. 3 is a cross-sectional view of the downstream end of the cyclonic fluid separator of FIG. 1 taken along line III-III and seen in the direction of the arrows;

DESSCRIPTION OF THE PREFERRED EMBODIMENT

Figure 4:
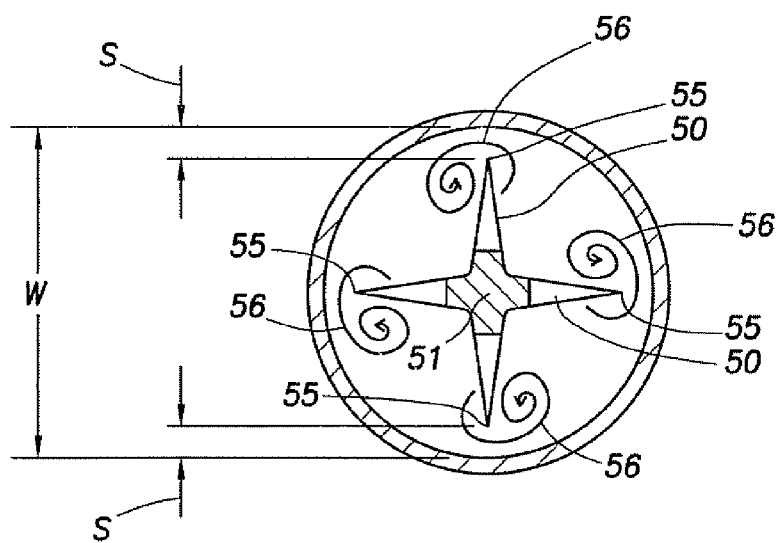
FIG. 4 is a schematic partially cross-sectional view of an alternative embodiment of the cyclonic fluid separator according to the invention wherein four delta-shaped swirl imparting wings are mounted on a central wing carrier body.

Referring to FIG. 1 there is shown a cyclonic fluid separator in which a multicomponent fluid mixture passes from an upstream inlet section 1 into a throat section 2 in which the fluid mixture is accelerated to a supersonic velocity and thereby expanded and adiabatically cooled such that one or more condensable components of the fluid mixture condense and/or solidify to liquid droplets and/or solid particles. The cooled mixture then flows at a supersonic velocity into a tubular midstream vortex generation section 3 in which a pair of delta shaped wings 4A and 4B are arranged at a sharp angle relative to a central axis I of the separator, which wings 4A and 4B generate vortices 6A and 6B in the fluid mixtures, which vortices 6A and 6B leave the wings 4A and 4B at or near the wing tips 5A and 5B. As a result of centrifugal forces the fluid near the centers of rotation of the vortices 6A and 6B consists of a substantially dry low density gaseous phase which is fed into a primary central fluid outlet 7. The liquid droplets and-or solid particles which have a higher density than the low density gaseous phase are centrifuged to the outer periphery of the vortices 6A and 6B and may form an annular liquid film or slurry 8 at the inner surface of the tubular separation section 3 downstream of the wings 4A and 4B, which is fed into an annular secondary outlet 9 which is separated from the central primary fluid outlet 7 by a tubular vortex finder 10. The annular secondary outlet 9 discharges the condensables enriched fluid mixture into a secondary fluid outlet conduit 12.

As shown in FIGS. 1 and 2 the tubular vortex generation section 3 has in the region of the wing tips 5A and 5B an inner width W.

In accordance with the invention the wing tips 5A and 5B are each located at a relatively small spacing S, less than 0.2W, from the inner surface of the tubular vortex generation section 3 and at a relatively large mutual distance D, which is between 0.6W and 0.99W, and preferably between 0.8W and 0.98W. The relatively large distance D between the wing tips causes that the centers of rotation of the vortices 6A and 6B are also located at a large distance from each other. The centers of rotation of the vortices 6A and 6B have a substantially helically shape around the central axis I and will gradually converge towards the central axis I. It has been found beneficial to the separation efficiency of the cyclonic separator if the tubular vortex finder 10 in the downstream separation section 14 has an entrance 11 which is located such that the vortices 6A and 6B have not yet commingled into a single vortex and if said entrance 11 has a corrugated shape as illustrated in FIG. 3. The vortex finder 10 is connected to the downstream end of the separator housing by a bearing assembly 13, which allows the vortex finder 10 to be rotated about the central axis I relative to the separator housing. Thus the vortex finder 10 may be rotated such that the centers of rotation of the swirls 6A and 6B are located near the centers of the outer lobes 11A and 11B of the corrugated entrance 11 vortex finder 10. The rotation of the vortex finder 10 may be controlled in response to a measurement of the liquid and/or solids content of the fluid discharged via the primary and secondary outlets 7 and 9 and such that the liquid and/or solids content in the primary outlet 7 is minimized whereas the liquid and/or solids content in the secondary outlet is maximized.

Figure 5:
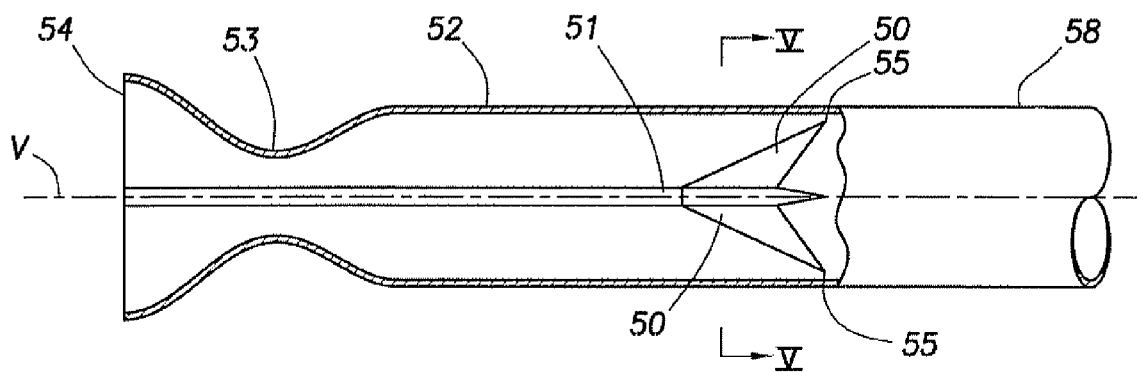
FIG. 5 is a cross sectional view of the cyclonic fluid separator of FIG. 4 taken along line V-V and seen in the direction of the arrows.

FIG. 5 shows an alternative embodiment of the cyclonic separator according to the invention wherein an assembly of four delta-shaped wings 50 is mounted on a central wing carrier rod 51. The rod 51 is rotatably arranged within a tubular separation section 52 of the separator and may extend through the throat section 53 and inlet 54.

As illustrated in FIGS. 5 and 6 the wing tips 55 are located a small spacing S from the inner surface of the tubular separation section 52 such that the wing tips widely spaced vortices 56 are generated. These vortices swirl helically around and will gradually converge towards a central axis V of the separator. A corrugated vortex finder (not shown) having four lobes may be arranged at the downstream separation section 58 of the separator such that each vortex enters one of the lobes. The vortex finder may be fixedly secured within the downstream separation section 58 of the separator and the central wing carrier rod 51 may be rotated relative to the separator housing to focus the vortices 56 accurately into the lobes of the corrugated vortex finder.

While the illustrative embodiments of the invention have been described with particularity, it will be understood that various other modifications will be readily apparent to, and can be easily made by one skilled in the art without departing from the spirit of the invention. Accordingly, it is not intended that the scope of the following claims be limited to the examples and descriptions set forth herein but rather that the claims be construed as encompassing all features which would be treated as equivalents thereof by those skilled in the art to which this invention pertains.

We claim:

1. A cyclonic fluid separator for separating condensable, liquid and/or solid components from a fluid mixture, the separator comprising an upstream fluid inlet section in which the fluid mixture is accelerated to a near sonic or supersonic velocity to expand and cool the fluid mixture such that one or more condensable fluid components are liquefied and/or solidified, a downstream separation section in which condensables depleted and condensables enriched fluid fractions are separated and fed into separate outlets, and a tubular midstream vortex generation section comprising a plurality of tilted wings, the wings having tips and the midstream vortex generation section having a region of the wing tips, and the wing tips are located at a spacing S less than 0.2W from the inner surface of the tubular midstream vortex generation section, which has an internal width W in the region of the wing tips.

2. The cyclonic fluid separator of claim 1, wherein the wing tips are located in a rotationally symmetrical configuration relative to a central axis of the tubular midstream vortex generation section.

3. The cyclonic fluid separator of claim 1, wherein a pair of tilted delta-shaped wings protrude from the inner surface of the tubular midstream vortex generation section in a rotationally symmetrical configuration relative to a central axis of the tubular midstream vortex generation section and such that the wing tips are located at substantially diametrically opposite locations relative to said central axis.

4. The cyclonic fluid separator of claim 2, wherein a distance (D) between the wing tips is between 0.6W and 0.99W.

5. The cyclonic fluid separator of claim 1, wherein three tilted delta shaped wings protrude from the inner surface of the tubular midstream vortex generation section in a rotationally symmetrical configuration relative to a central axis of the tubular midstream vortex generation section and such that the wing tips are located at angular intervals of substantially 120 degrees relative to said central axis.

6. The cyclonic fluid separator of claim 1, wherein at least two delta-shaped wings are mounted at regular angular intervals on an elongate wing carrier body which is substantially co-axial to a central axis of the tubular midstream vortex generation section.

7. The cyclonic fluid separator of claim 1, wherein a corrugated tubular vortex finder is arranged within the downstream separation section of the separator and a condensables depleted fluid outlet is connected to the interior of the vortex finder and a condensables enriched fluid outlet is connected to an annular space between the outer surface of the tubular vortex finder and the inner wall of the downstream separation section of the separator.

8. The cyclonic fluid separator of claim 7, wherein the orientation of the corrugated tubular vortex finder is adaptable relative to the central axis of the tubular midstream section of the separator.

9. The cyclonic fluid separator of claim 6, wherein the wing carrier body extends through a throat section in the upstream fluid inlet section of the separator and comprises in a region of a throat portion of the nozzle a profiled section having a larger cross-axial surface than the section of the elongate wing carrier body on which the wings are mounted.

10. The cyclonic fluid separator of claim 5, wherein the elongate wing carrier body is rotatably mounted within the tubular midstream section of the separator.

11. The cyclonic fluid separator of claim 4, wherein the distance (D) between the wing tips is between 0.8W and 0.98W.

* * * * *